United States Patent
Terwort et al.

(10) Patent No.: US 6,698,383 B1
(45) Date of Patent: Mar. 2, 2004

(54) METHOD FOR DISPOSAL OF EXCREMENTS OF ANIMALS KEPT IN A STABLE AND DEVICE FOR IMPLEMENTING SAID METHOD

(75) Inventors: Roland Terwort, Steinfurt (DE); Christoph Wettendorf, Suttorf 40, D-48356 Nordwalde (DE)

(73) Assignee: Christoph Wettendorf, Nordwalde (DE)

( * ) Notice: Subject to any disclaimer, the term of this patent is extended or adjusted under 35 U.S.C. 154(b) by 0 days.

(21) Appl. No.: 09/787,193

(22) PCT Filed: Sep. 16, 1999

(86) PCT No.: PCT/EP99/06851
§ 371 (c)(1),
(2), (4) Date: Aug. 6, 2001

(87) PCT Pub. No.: WO00/15027
PCT Pub. Date: Mar. 23, 2000

(30) Foreign Application Priority Data

Sep. 16, 1998 (DE) .................................. 298 16 589 U
Dec. 3, 1999 (DE) .......................................... 199 10 993

(51) Int. Cl.⁷ .................................................. A01K 1/01
(52) U.S. Cl. ...................................... 119/451; 119/450
(58) Field of Search ................................ 119/450, 451, 119/447, 479, 527

(56) References Cited

U.S. PATENT DOCUMENTS

| | | | | | |
|---|---|---|---|---|---|
| 3,955,536 A | * | 5/1976 | Bunger | ........................ | 119/451 |
| 3,982,499 A | * | 9/1976 | Frankl | ........................ | 119/450 |
| 4,060,054 A | * | 11/1977 | Blair | ........................ | 119/447 |
| 4,320,008 A | * | 3/1982 | Kokubo | ........................ | 119/451 |
| 5,205,930 A | * | 4/1993 | Obrestad | ........................ | 210/251 |
| 5,290,451 A | * | 3/1994 | Koster et al. | ................ | 210/605 |
| 5,450,815 A | * | 9/1995 | Krehl et al. | ................. | 119/458 |
| 5,482,528 A | * | 1/1996 | Angell et al. | .................. | 71/12 |
| 5,568,895 A | * | 10/1996 | Webb et al. | .................. | 241/16 |
| 5,653,879 A | * | 8/1997 | Schroeder | .................... | 210/298 |
| 5,817,241 A | * | 10/1998 | Brayboy | ..................... | 210/800 |
| 5,853,450 A | * | 12/1998 | Burnham et al. | ................. | 71/9 |
| 2002/0144478 A1 | * | 10/2002 | Oroz | ......................... | 52/302.1 |

FOREIGN PATENT DOCUMENTS

| | | |
|---|---|---|
| DE | 3103693 | 9/1982 |
| DE | 4121223 | 1/1993 |
| DE | 199 10 993 | 3/2000 |
| EP | 0 227 155 | 7/1987 |
| EP | 0 498 084 A | 8/1992 |
| EP | 0 850 561 A1 | 7/1998 |
| GB | 1 434 281 | 5/1976 |
| NL | 9101388 | 3/1993 |

OTHER PUBLICATIONS

Publication: Mar. 3, 1979 Einstreulose Nutztierhaltung ohne Gülleanfall, p. 124—No translation included.

* cited by examiner

Primary Examiner—Peter M. Poon
Assistant Examiner—Joan M. Olszewski
(74) Attorney, Agent, or Firm—Sonnenschein, Nath & Rosenthal

(57) ABSTRACT

The invention relates to a method for the disposal of excrements of animals kept in a stable, wherein solid manure is separated from liquid manure in the stable and separately removed from the stable and separately stored and/or subjected to further processing. The new system is characterized in that the removal of solid and liquid manure and storing/further processing thereof is effected before the onset of decomposition and in that further processing of the solid manure comprises at least the following steps: surface expansion of the fresh manure and drying of the manure with a humidity content preventing decomposition. The invention also relates to a device for implementing the method.

28 Claims, 4 Drawing Sheets

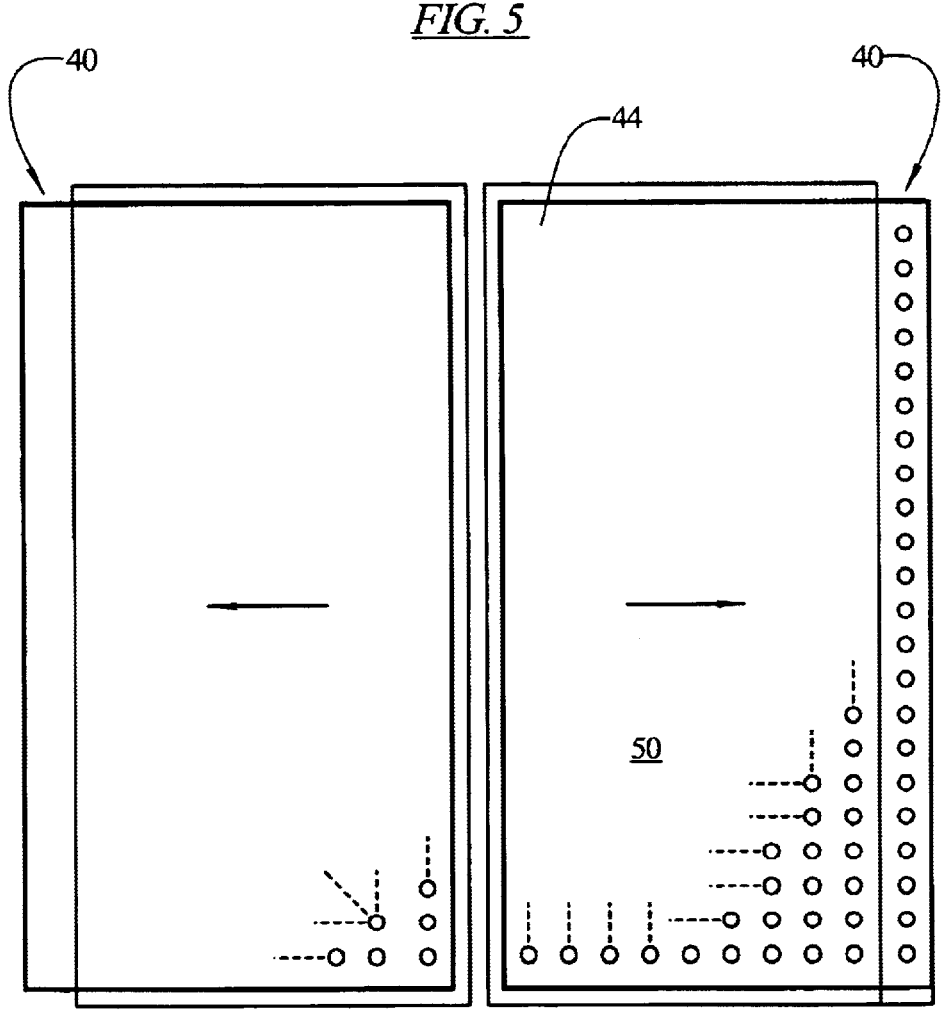

METHOD FOR DISPOSAL OF EXCREMENTS OF ANIMALS KEPT IN A STABLE AND DEVICE FOR IMPLEMENTING SAID METHOD

BACKGROUND OF THE INVENTION

The present invention relates to a method for removing excrement, made up of feces and urine, of animals kept in a stall, in particular pigs. In addition, the invention relates to an apparatus for executing the method.

In wide use in practice, and therefore generally known, are stalls whose floor surface is constructed so as to be entirely or partially permeable to excrement, for example as a slatted floor, a liquid manure channel for the collection and common drainage of feces and urine being provided under the permeable floor. The liquid manure channel has a relatively large capacity, because it is used not only to collect but also to store feces and urine, i.e., liquid manure. From time to time the liquid manure channel is emptied, whereby the liquid manure is then pumped either into a liquid manure container outside the stall or into a transport vehicle so that it can be applied on a field surface. Significant environmental pollution, due to the formation and diffusion of ammonia and methane gas, disadvantageously arises both in the stall during the collection and storing of the liquid manure and also in the surroundings of the liquid manure container, or in the surroundings of a field surface dunged with liquid manure. In particular, unpleasant odors arise that are felt by most of those affected to be strongly disturbing, and that also have an adverse effect on the health of the animals kept in the stall. In order to avoid damage to the animals kept in the stall, an intensive exchange of air is required, which takes place using ventilators, for which a considerable amount of electrical energy must be used. However, this intensive air exchange again results in an increased discharge of harmful gas outside the stall.

A partial reduction of the disadvantages stated above, in particular in the interior of the stall, can be achieved by mechanical cleaning apparatuses, such as those known for example from DE 43 12 128 A1 or from DE 21 27 370 A1. Using these known cleaning apparatuses, feces and urine are transported together from a deposition surface into a liquid manure collection region, so that a reduced degree of pollution is achieved inside the stall. However, here as well the environmental pollution outside the stall, due to liquid manure stored in a container and due to liquid manure applied on field surfaces as dung, occurs to an unreduced extent.

From DD-PS 21 15 96, a method is known for the fractional mechanical drainage of liquid manure in animal stalls, in particular for calf stalls. This method is characterized in that the following are preferably combined: a perforated floor extending over as much of the overall space occupied by the animals as possible, a large portion of said floor being occupied by holes, and a fecal surface, inclined transverse to the row of standing animals and having a conduit for urine and having a blade that is divided into sections and that has a slow advance rate, as well as having separate dumping pits for the solid and the liquid phase at the end of the row of standing animals, with connection to separate supply containers. Beyond the separate carrying off and storage of feces and urine, however, this prior art does not supply any indication as to whether and in what way a further treatment of feces and/or urine is to take place.

SUMMARY OF THE INVENTION

The object of the present invention is therefore to create a method and an apparatus for the execution of the method of the type named above that avoid the stated disadvantages and with which an improved—in particular, more environmentally friendly and less harmful to animals—disposal of the excrement is achieved.

With respect to the method, the object is achieved by a method of the type named above that is characterized in that the carrying off of feces and urine from the stall and the storing and/or further treatment thereof takes place in a fresh state, before the beginning of a decomposition, and in that the further treatment of the feces comprises at least the following steps:

a surface enlargement of the fresh feces, and a drying of the feces to a moisture content that prevents a decomposition.

It is essential to the invention that feces and urine are carried off from the stall not only separately from one another but also in a still-fresh state, before the beginning of a decomposition, so that in the stall no stress due to excrement stored there and deposited there for a longer period, and the decomposition products thereof, can occur. In addition, it is provided according to the invention that the further treatment of the feces comprises at least the two described steps. The further treatment serves first of all to prevent the feces from developing environmentally harmful properties as a result of decomposition, and in addition to make the feces profitably recoverable. Since, due to the separation from the urine, the fresh feces conveyed out of the stall already has a relatively low moisture content, and because according to the invention a surface enlargement of the feces is carried out, for example using a vibrating apparatus or a perforated plate, with the inventive method it is possible for the first time to dry the feces with a reasonable energy expense. The drying temperature can thereby be relatively low, so that it is possible to use waste heat for the drying; moreover, the drying temperature should remain below 60° C., in order to avoid an undesirable decomposition caused by temperature. In its dried state, the feces can be stored and transported, because, due to the lack of liquid in the feces, no bacterial decomposition can take place, and because it is then also hardly possible any longer for unpleasant odors to arise.

After being removed from the stall, the urine does not absolutely have to be further treated, because between 85 and 99% of all nutrients and salts remain in the solid material, i.e., in the feces. For this reason, the urine can and may be applied directly onto farming surfaces, or may be drained off as sewage.

With the inventive method, a drastic reduction of the ammonia content in the stall air is achieved, so that the ventilation inside the stall can be correspondingly reduced. Moreover, the harmful formation of methane gas in the stall is precluded. The number of germs in the stall air is drastically reduced, because, due to the separate carrying off of feces and urine in a fresh state, no bacterial decomposition can occur inside the stall. In contrast to liquid manure, the carried-off urine does not decompose, because the bacteria still contained in the urine are not presented with a sufficient quantity of nutrients. For this reason, a conversion of the urea contained in the urine into ammonia can no longer occur.

The further treatment of the feces and, if necessary, of the urine can take place with a delay, including intermediate storage, or can take place immediately. The choice here is made in particular according to the quantities of urine and feces that occur and are to be treated, and also according to whether the respective apparatus for further treatment is better operated continuously or in charge-by-charge fashion.

A preferred development of the method provides that the drying of the feces takes place at first only until a moisture content between approximately 10 and 25 weight % has been reached, and that the feces is then pressed, with further reduction of moisture, to form pressed pieces having a residual moisture content that prevents a decomposition. The pressing of the feces to form pressed pieces necessarily results in a reduction in moisture, because the pressure exerted presses out a large part of the previously contained moisture, without its being necessary to provide a separate drying step for this purpose. The previous drying can therefore be limited to the indicated incomplete drying, which limits the expense for the previous drying, in particular the energy expense. Moreover, in comparison with dried feces in powdered form, the feces pressed to form pressed pieces is easy to handle and can be stored and transported easily, which significantly improves and simplifies the further use of the dried feces.

A preferred method for the separation of feces and urine, which advantageously requires a low expense and the same time ensures a high degree of separation is provided wherein the separation of feces and urine takes place in that the urine is conducted from an excrement deposition surface into a urine collection canal or channel via a gradient or slope of the disposition surface, and the feces is carried off mechanically, in a direction deviating from the gradient direction, and with maintenance of a distance from the urine collection channel, whereby the deposition surface gradient is maximally of a magnitude such that after deposition the feces remains lying securely on the deposition surface.

In addition, during the pressing the dried feces is preferably pressed into pressed pieces having a size corresponding to their intended use, preferably into pellets or briquettes. In this form, the dried feces can be packed for example into bags or other transport receptacles, and can be easily transported. Because the volume of the dried feces is very small in comparison to previously occurring quantities of liquid manure, the dried feces can also be economically stored and transported over large distances, so that it can also be taken to more remote areas at a reasonable expense.

As an additional measure against a formation of germs in the feces, or in order to exterminate germs that may be found in the feces as a result of animal diseases, the feces can be impregnated or coated—before the drying or before or after the pressing—with a dry, powdered disinfecting agent. For example, calcium hydroxide or calcium oxide can be used as a disinfecting agent.

The pressed fecal pieces can advantageously be used as dung, for example for field surfaces or grassland, or for horticulture or vegetable gardening. Since no decomposition takes place in the dried feces, a longer storage time no longer presents a problem: all nutrients in the dried feces remain fully maintained. It is also advantageous that the dried feces comprises a neutral pH value of about 7, so that its application does not contribute to the acidification of the soil. Alternatively, it is also possible to use the pressed fecal pieces as fuel. The pressed fecal pieces reach a calorific value of more than 5000 kcal, corresponding approximately to the value of dried oak wood. Because the content of harmful materials, in particular the heavy metal content, of the pressed fecal pieces is very low, a correspondingly clean burning, with exhaust gases low in harmful materials, can be achieved. Only carbon dioxide and water occur as the main combustion products.

With respect to the urine that occurs, it is preferably provided that after its drainage from the stall this urine be used, in untreated form or after a further treatment, for irrigation with a slight dunging effect. Due to the relatively low content of nutrients and salts in the urine, there is no danger that the application of the urine will result in over-dunging or in damage to surface bodies of water and groundwater. The urine can thus partially replace fresh water that is used for irrigation and is correspondingly expensive.

With respect to the further treatment of the urine, it is preferably provided that this treatment takes place through oxidation and/or disinfection. The oxidation achieves in particular a breakdown of organic components still contained in the urine, made up of small portions of feces that can still enter the urine despite the separation. The disinfection has the result that a decomposition, with formation of ammonia or other decomposition materials that are harmful to the environment and are foul-smelling, no longer takes place.

Alternatively, or in addition, the further treatment of the urine can take place by a one-stage or multistage mechanical or mechanical-biological clarification. In such a to clarification, there usefully first takes place a precipitation of solid materials, whereby the urine is freed of nutrients for microorganisms. In the simplest case, this can be achieved already by a two-chamber or three-chamber system.

In addition, the further treatment of the urine can take place through vaporization of its liquid portion and, if necessary, drying of the remaining solid substances. In this way, on the one hand there arises essentially water vapor, which can be released into the air without the risk of environmental damages, and on the other hand there arises a remaining solid substance, which can either be reused as "sludge," for example as dung, or which can, as explained above in relation to the feces, likewise be dried and then reused in the same manner as the dried feces.

In order to enable the method to be executed as economically as possible, it is preferably provided that heat energy from stall exhaust air heated by animal body heat is used for the drying of the feces and/or for the vaporization of the liquid portion of the urine and/or for a pre-heating of fresh air to be supplied to the stall. The animals kept in the stall present a source of heat energy that constantly produces an excess of heat. Previously, in standard stalls, this heat has simply been blown into the environment with the ventilating air, without deriving an advantage from the heat energy. With the present invention, the heat energy of the stall exhaust air is put to rational use, whereby a possible lack of heat energy can be supplied from other energy sources as needed, for example by means of burning of pressed pieces of dried feces, or from conventional liquid, gaseous, or solid fuels, or through electrical energy.

In order to avoid possible odor and dust pollution from exhaust air, it is further proposed that exhaust air occurring during the drying and/or during the vaporization be conducted through at least one filter that reduces or removes odors and/or dust, and released into the atmosphere.

In addition, the invention proposes that at least one partial current of the stall exhaust air be disinfected before or after its use for drying the feces and/or for vaporizing the liquid portion of the urine, and then used immediately for the aeration of the urine, for the oxidation and/or disinfection thereof. The disinfected airstream itself has an effect on the urine aerated therewith that is at least oxidizing, and, to the extent that disinfecting substances are also contained in the airstream, is also disinfecting.

The disinfection preferably takes place by irradiation of the urine and/or of the stall exhaust air with UV radiation or gamma radiation. Besides a disinfection, the cited radiations achieve at the same time a destruction of organic molecules, so that in this way, for example antibiotics can also be destroyed. Given irradiation of the exhaust air with UV radiation, there arises ozone, which has a disinfecting effect, and with which the aeration of the urine and the simultaneous disinfection thereof can for example also take place.

Overall, with the inventive method and its developments an effective reduction of stress on the environment is achieved with respect to soil and water. Since it is no longer necessary to store and apply liquid manure, excess nitrates no longer enter into the soil and into the surface water. The nutrient content of the excrement stands at approximately 85 to 99% in the feces and in the dried feces produced therefrom. In this way, in contrast to the application of liquid feces, a well-directed dunging, in particular a dunging in accordance with needs and time, is possible. With the inventive method, the previous sources of ammonia that are to be rated as harmful, namely stalls, containers of liquid manure, and surfaces for the application of liquid manure, are freed almost entirely of their harmful properties.

For the solution of the second part of the object of the invention, an apparatus for executing the method that is characterized in that via the carrying-off paths urine and feces can be carried out of the stall in a fresh state before the beginning of a decomposition, and can be supplied to the storage or further treatment means, and in that the apparatus for the further treatment of the feces comprises at least the following apparatus parts:

a device for the surface enlargement of the fresh feces, and a drying device for drying the feces to a moisture content that prevents a decomposition.

With an apparatus constructed in this way, the method according to the invention, explained above, can in principle be carried out, so that the cited advantages are achieved.

In addition, the apparatus for the further treatment of the feces preferably comprises a pressing device for the production of pressed fecal pieces, having a residual moisture content that prevents a decomposition, from feces that has first been dried in the drying device only to a moisture content between approximately 10 and 25 weight percent. The pressing device necessarily provides a reduction of moisture in the feces due to the pressure exerted, so that a less extensive preliminary drying in the drying device is sufficient, which saves drying time and energy.

As a development of the apparatus for the execution of the method presented above, a separating apparatus is provided that offers, with a relatively low technical expense, a reliable and maximally complete separation of the excrement into urine on the one hand and feces on the other hand.

In a further construction, it is preferably provided that the stall is constructed, at least over a part of its floor surface, with a slatted floor, and that the surface for the deposition of the excrement is the bottom surface of a canal or channel arranged underneath the slatted floor, and that the gaps in the slatted floor and the direction of the gradient run essentially parallel to one another. This construction of the apparatus offers in particular the advantage that the mechanical feces removal device does not move in an area occupied by the animals. In this way, the animals are not disturbed or endangered by the removal device. Through the parallel orientation of the gaps in the slatted floor and the direction of the gradient, it is in particular achieved that the feces deposited on the deposition surface cannot form a "dam" that could prevent the urine from flowing into the urine collection canal. Rather, here it is achieved that the urine flows into the urine collection canal between the feces deposited in the direction of the gaps, without hindrance and without carrying feces along with it.

Various technical solutions are possible for the feces removal device. A first solution provides that the feces removal device is formed by a feces blade that can preferably be moved parallel to the urine collection conduit.

An alternative construction of the feces removal device provides that the deposition surface is constructed as a conveyor that can be moved preferably parallel or transverse to the urine collection canal, in the form of one or more flexible conveyor belts or articulated slat conveyors. The conveyor belt or slat conveyor can be constructed with a closed or perforated surface; if perforations are present, the urine can flow off through these while the feces remains on the surface, so that in this construction the gradient of the deposition surface can be omitted.

All the constructions of the feces removal device achieve on the one hand a hindrance-free carrying off of the urine into the urine collection canal, and on the other hand a removal, separate therefrom, of the feces, with the maintenance of a distance from the urine collection canal. In practice, it is sufficient to set into operation the feces removal device at an interval of a few hours, for example approximately three hours, in order to remove the feces that has occurred in the meantime. In such a time period, the feces remain fresh, i.e., no significant decomposition processes have yet begun therein.

Additional preferred and advantageous constructions and developments of the apparatus for the execution of the method are provided, whereby these constructions of the apparatus ensure in particular the execution of the method constructions further explained above, with suitable technical means.

BRIEF DESCRIPTION OF THE DRAWINGS

In the following, an example of the method and of the apparatus for the execution thereof are respectively explained on the basis of a drawing.

FIG. 5 schematically shows an alternative feces removal device in a partial top view.

DETAILED DESCRIPTION OF THE PREFERRED EMBODIMENTS

Figure 1:
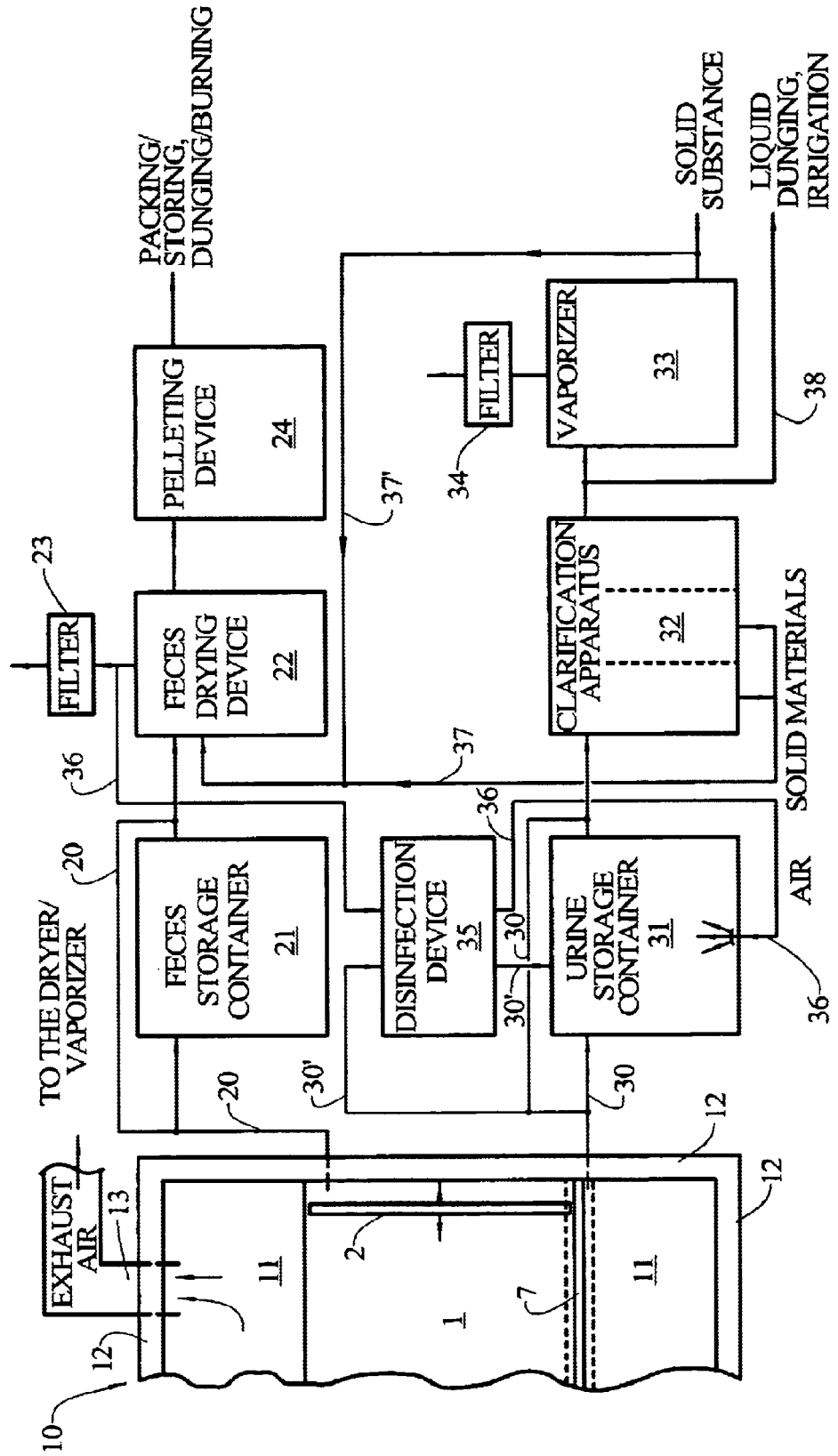
FIG. 1 shows a schematic block diagram of an example of the method.

FIG. 1 of the drawing shows, at the left, a part of a stall 10, surrounded by walls 12, preferably having a heat insulation. In the interior of the stall 10 there are located lying surfaces 11 as well as an excrement deposition surface 1. The deposition surface 1 can be arranged so as to be slightly recessed between the lying surfaces 11, or can also be located, in the form of an underfloor canal, underneath a slatted floor that is not shown here for reasons of clarity. The deposition surface 1 has a gradient α, which in FIG. 1 runs downward. At the lower edge of the deposition surface 1, there is a urine collection canal 7, into which the urine released onto the deposition surface 1 by the animals kept in the stall 10 flows under the influence of gravity. The gradient of the deposition surface 1 is thereby maximally of a magnitude such that feces deposited thereon by the animals remains there and does not slide into the urine collection canal 7. For the removal of the feces from the deposition surface 1, a feces removal device is used having a feces blade 2 that is oriented transverse to the collection canal 7 and that can be moved along the deposition surface 1 in the direction of the double arrow, parallel to the collection canal 7. Given motion of the blade 2 from left to right, the occurrent feces is removed from the stall 10.

The urine collected in the urine collection canal 7 usefully flows, with a natural gradient, through the canal 7 into a urine removal path 30 or 30', which is usefully formed by pipelines, having if necessary an intermediately connected pump (not shown).

The fresh feces removed from the stall 10 moves, via the removal path 20, either first into a feces storage container 21 or immediately into a feces drying device 22. In the feces storage container 21, an intermediate storage, for a limited time, of the fresh feces is possible as needed. The storage time is thereby limited by the time until the beginning of the decomposition of the feces.

In the feces drying device 22, the fresh feces is dried up to the point of a predeterminable residual moisture content. Here, according to the provided further treatment or use of the feces, a complete drying (i.e., a drying to a low residual moisture content that prevents decomposition) or a pre-drying to a somewhat higher residual moisture content that is subsequently reduced further is possible. The feces storage container 21, connected upstream, is thereby in particular used to ensure a uniform supplying to the feces dryer 22, which is advantageous for the functioning thereof. If suitable, or only relatively small, quantities of feces are removed from the stall 10, the storage container 21 can also be bypassed, and the fresh feces can be supplied directly to the drying device 22, whereby quantities of feces that may be lacking can be taken from the feces storage container 21. The exhaust air exiting from the feces drying device 22, which carries with it the moisture removed from the feces in the form of water vapor, is usefully passed through a filter 23 in order to avoid odor pollution. The filter 23 can for example be a biomass filter and/or an active carbon filter.

After the drying (here a pre-drying), in a pressing device 24 connected downstream, for example a pelleting device, the feces can be pressed to form pressed pieces, for example pellets, whereby additional moisture is removed from the already pre-dried feces, and whereby the dried feces obtains a consistency that makes it easy to treat and to handle. After the pressing, the residual moisture content is low enough that a decomposition of the feces is precluded. In the form of pressed pieces, the dried feces can be supplied for packaging and/or storing, after which the pressed pieces are preferably used as dung. Alternatively, the pressed pieces, or the non-pressed dried feces, can also be used as fuel, because they have a sufficiently high calorific value.

The urine carried off from the stall 10 optionally travels, via the carry-off path 30, immediately into a urine storage container 31, or, via a carry-off path 30', is additionally conducted through a disinfection device 35 and then supplied to the urine storage unit 31. The disinfection thereby usefully takes place by means of UV radiation or gamma radiation, whereby germs are killed and organic compounds, for example medications, are destroyed.

In addition, it is possible to aerate the urine storage container 31 via an air line 36, in order to achieve an oxidation and/or additional disinfection of the urine inside the urine storage unit. The air used for this purpose is preferably taken from the exhaust air of the feces drying device 22, and is moreover preferably conducted through the disinfection device 35. If the disinfection device operates using UV radiation, ozone necessarily arises in the disinfected air, said ozone having an oxidizing and disinfecting effect after being blown into the urine in the urine storage unit 31.

A clarification apparatus 32, for example a multichamber apparatus, is connected downstream from the urine storage unit 31. A uniform supplying of urine is advantageous for the functioning of this clarification apparatus 32 as well, whereby the urine storage unit 31 acts here as a buffer. If the quantity of urine coming from the stall 10 is suitable, the urine can also be supplied immediately to the clarification apparatus 32. In the clarification apparatus 32, solid materials still contained in the urine are deposited and/or broken down biologically. The solid materials deposited in the clarification apparatus 32 can be drawn off via a solid material removal line 37 and supplied to the feces drying device 22, where they are dried together with the fresh feces. The liquid leaving the clarification apparatus 32 is purified to such an extent that it can be drawn off via a line 38 and used for irrigation with light dunging for example of fields, without thereby releasing harmful materials into the air or the soil.

Alternatively, or in parallel fashion, the liquid leaving the clarification apparatus 32 can be supplied to a vaporizer 33 connected downstream, in which the liquid is vaporized, and from which, moreover, the solid substance still remaining after the vaporization is outputted. This solid substance can, as can the deposited solid materials from the clarification apparatus 32, be supplied to the feces drying device 22 via a line 37', for drying. Alternatively, the solid substance can also be drawn off in the form in which it occurs at the output of the vaporizer 33, and can be supplied for use for example as dung. The exhaust air leaving the vaporizer 33 is usefully conducted through a filter 34, whereby this filter is also usefully a biomass filter and/or active carbon filter. It is also possible to combine the two filters 23 and 34 to form a single, correspondingly larger, filter.

Heat energy is required both for the feces drying device 22 and for the vaporizer 33. This heat energy is usefully obtained from the warm stall exhaust air, drawn out of the stall 10 through an exhaust air channel 13. According to the construction of the drying device and the vaporizer, the exhaust air can thereby be used immediately, or after passing through a dehumidifier, or after heat exchange in a heat exchanger. If the heat energy that can be obtained from the exhaust air is not sufficient for the cited purposes, heat energy must be additionally produced and supplied, whereby here the heat energy is preferably produced by burning dried feces. Other known energy sources can of course also be used.

For a good functioning of the method, a separation that is as complete as possible of the excrement deposited by the animals kept in the stall 10 into urine on the one hand and feces on the other hand is essential. An example of an effective separating device is shown in FIGS. 2 and 3.

Figure 2:
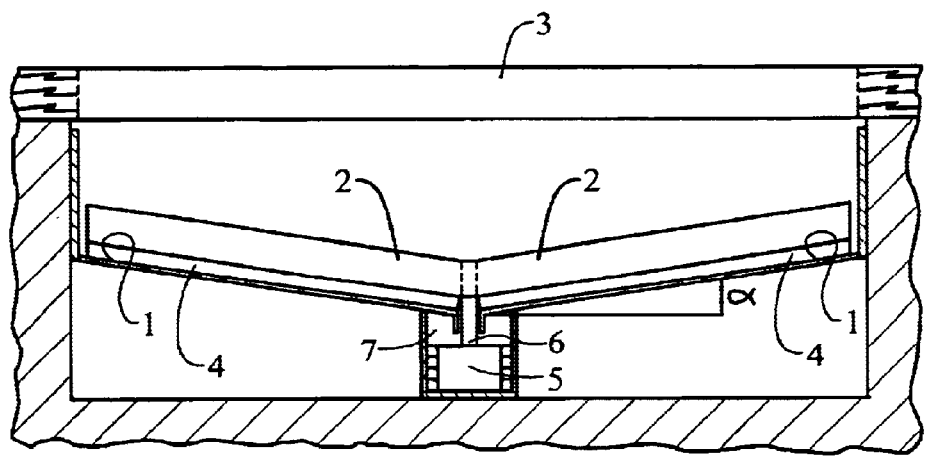
FIG. 2 shows a stall with an apparatus for the execution of the method in a partial vertical section.

FIG. 2 shows, in a partial vertical section, a segment of a stall whose floor surface is partially formed by a slatted floor 3. Underneath the slatted floor 3, there is located an underfloor canal into which a deposition surface 1 is built. The deposition surface 1 is constructed so as to be symmetrical to a mid-axis, and has a gradient pointing downwards from the outside towards the middle. In the exemplary embodiment shown, the angle α of this gradient is approximately 8°; in the selection of this angle α it is important that on the one hand the urine impinging on the deposition surface 1 flow down the gradient under the effect of gravity, and on the other hand feces falling onto the deposition surface 1 remain lying thereon without sliding downward.

In the longitudinal center of the deposition surface 1 there runs a urine collection canal 7 into which the urine flows from the deposition surface 1 under the effect of gravity. The urine collection canal 7 then leads out of the stall, as is explained on the basis of FIG. 1. In addition, FIG. 2 shows a feces blade 2, made up of two wings that slide over the deposition surface 1 and that are provided on their lower edge with an elastic scraping rail 4, made for example of rubber. In its center, the blade 2 is connected at the bottom, by means of a connection piece 6, with a guide element 5 that is guided in the interior of the urine collection canal 7. Using a traction means (not visible in FIG. 2), the guide element 5 can be moved in the longitudinal direction of the collection canal 7 in both directions, whereby the blade 2 is correspondingly moved simultaneously. In its motion over the deposition surface 1, the blade 2 pushes the deposited feces before it to one end or to both ends of the deposition surface 1, from where the feces is removed to a point outside the stall, as is described in FIG. 1. It is thereby ensured that the feces does not fall into the interior of the urine collection canal 7.

Figure 3:
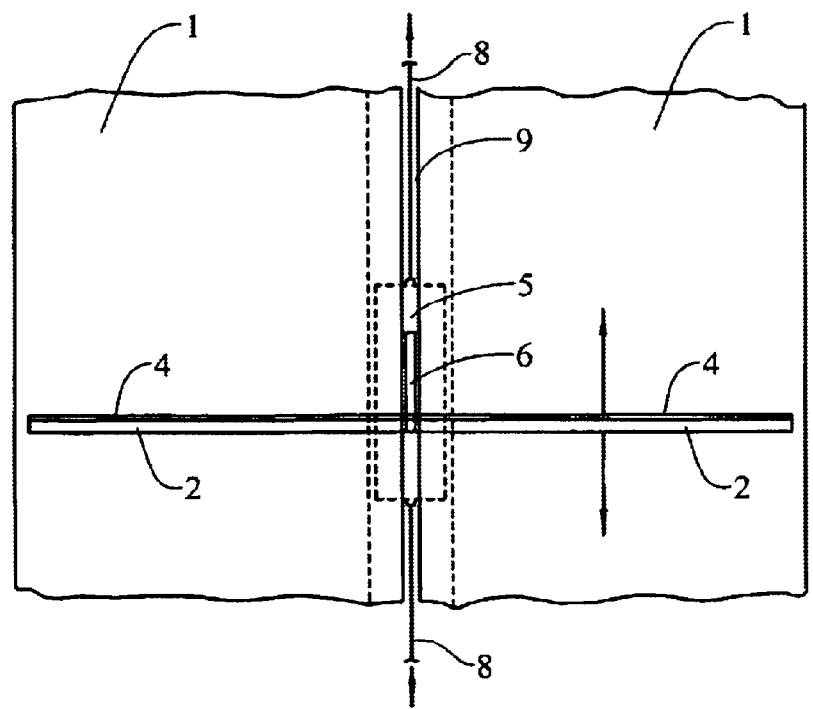
FIG. 3 shows the apparatus according to FIG. 2 in a top view.

FIG. 3 shows particularly clearly the construction of the blade 2, as well as the means for its guiding and motion. The blade 2 runs transverse to the longitudinal direction of the deposition surface 1, and can be moved back and forth in the direction of the double arrow. The guide element 5 is located in the interior of the urine collection canal 7, which is upwardly covered to the greatest possible extent and is connected with the deposition surface 1 only via a relatively narrow intake gap 9. The connection piece 6 runs through this intake gap 9 between the guide element 5 and the blade 2 and connects these two parts with one another. Moreover, in FIG. 3 the traction means 8 can now be seen, which is for example a chain or a cable and is fastened to the front side and to the back side of the guide element 5. The traction means 8 runs over the entire length of the collection canal 7 and is led back to a point not visible here, in order to form a closed train. The traction means 8 can be driven at a point located outside the canal 7, for example by means of a chain wheel that can be driven rotationally by a motor, or by means of a pulley, in order to produce the desired motion of the blade 2.

As is shown in FIGS. 1 to 3, it is also unproblematically possible to retrofit an already-existing stall 10 with the elements and apparatuses required for the execution of the method. In particular, FIG. 2 shows that the space in which the deposition surface 1 with the blade 2 is arranged can be a conventional and already-existing liquid manure chamber. The remodeling work inside the stall is thereby limited to a relatively small amount. The further components of the apparatus for the execution of the method are usefully arranged and installed outside the stall 10, in a separate building and/or outdoors.

Figure 4:
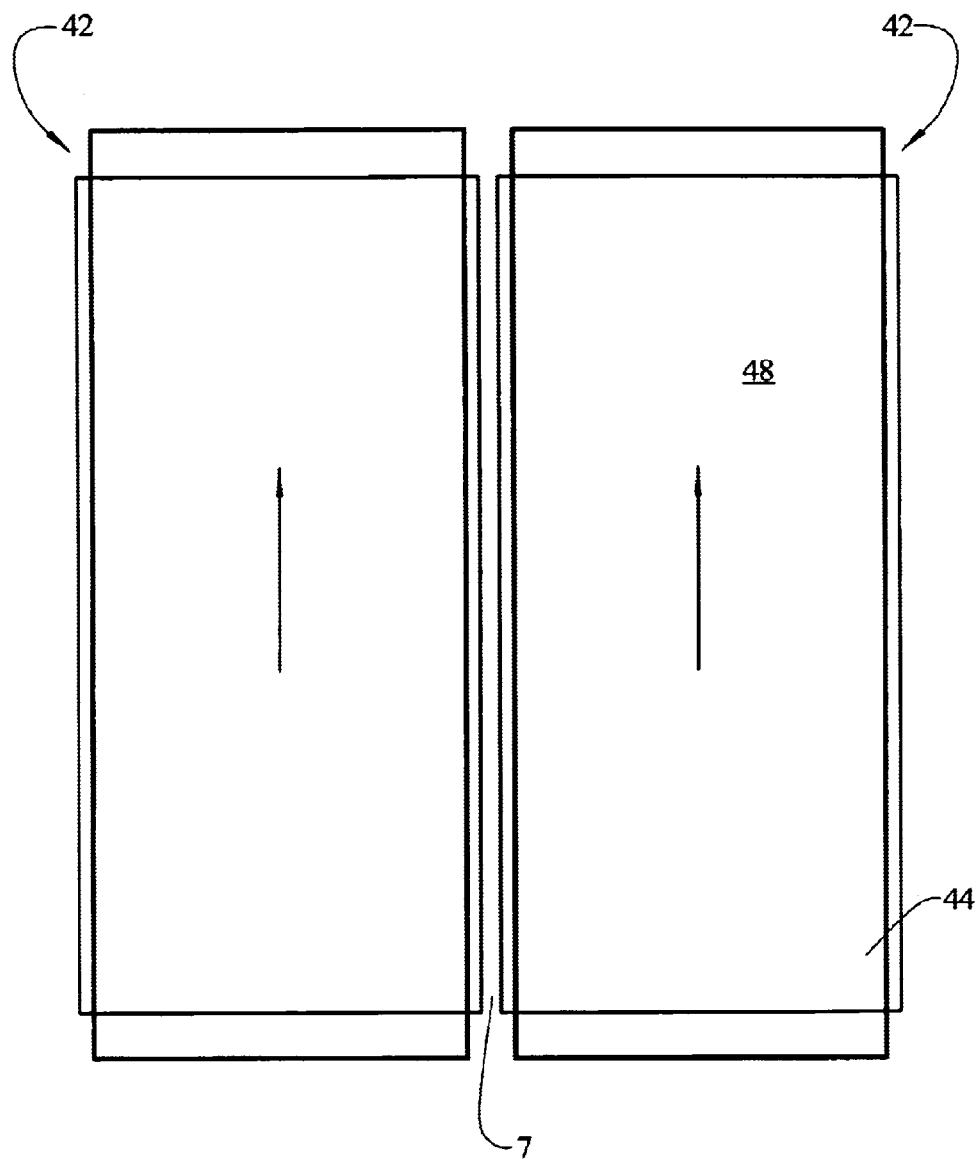
FIG. 4 schematically shows an alternative feces removal device in a partial top view.

Alternative constructions of the feces removal device provide that the deposition surface is constructed as a conveyor 40, 42 that can be moved preferably parallel (FIG. 4) or transverse (FIG. 5) to the urine collection canal 7, in the form of one or more flexible conveyor belts 44 or articulated slat conveyors not illustrated. The conveyor belt 44 or slat conveyor can be constructed with a closed 48 or perforated 50 surface. If perforations are present, the urine can flow off through these while the feces remains on the surface, so that in this construction the gradient of the deposition surface can be omitted.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

What is claimed is:

1. A method for disposing of excrement, made up of feces and urine, of animals kept in a stall, comprising the steps:
   separating feces and urine in the stall,
   removing the feces and urine from the stall separately from one another, optionally storing and further treating the feces and urine separately from one another,
   whereby the steps to removing the feces and urine from the stall and the storing or the further treatment thereof takes place in a fresh state, before the beginning of a decomposition, and whereby the step of further treatment of the feces comprises a surface enlargement and drying of the feces, and the further step of drying the feces to a moisture content that prevents a decomposition, at which moisture content the feces can be stored and transported.

2. A method according to claim 1, wherein the step of drying of the feces first takes place only to a moisture content between approximately 10 and 25 weight %, and then pressing the feces, with additional moisture reduction, to form pressed pieces having a residual moisture content that prevents a decomposition.

3. A method according to claim 1, wherein the step of separating the feces and urine takes place in that the urine is conducted from an excrement deposition surface into a urine collection canal via a gradient of the deposition surface, and the feces is carried off mechanically, in a direction deviating from the gradient direction, and with maintenance of a distance from the urine collection canal, whereby the deposition surface gradient is maximally of a magnitude such that after deposition, the feces remains lying securely on the deposition surface.

4. A method according to claim 2, wherein during pressing the dried feces is pressed into pressed pieces having a size corresponding to their use, preferably pelleted or briquetted.

5. A method according to claim 4, wherein the pressed fecal pieces are used as dung or as fuel.

6. A method according to claim 1, wherein before the drying or before the feces is impregnated or coated with a dry powdered disinfecting agent.

7. A method according to claim 1, wherein after its removal from the stall the urine is used, in untreated form or after a further treatment, for irrigation with a light dunging effect.

8. A method according to claim 1, wherein the further treatment of the urine takes place through oxidation and/or disinfection.

9. A method according to claim 8, wherein said step of disinfection occurs through irradiation of the urine and/or of the stall exhaust air with UV radiation or gamma radiation.

10. A method according to claim 1, wherein the further treatment of the urine takes place through a one-stage or multistage mechanical or mechanical-biological clarification.

11. A method according to claim 1, wherein the further treatment of the urine takes place through vaporization of its liquid portion and, if necessary, drying of the remaining solid substance.

12. A method according to claim 1, including the step of using heat energy from stall exhaust air heated by animal body heat for the drying of the feces and/or for the vaporization of the liquid portion of the urine and/or for a pre-heating of fresh air that is to be supplied to the stall.

13. A method according to claim 12, including the step of conducting exhaust air occurring during the drying and/or during the vaporization through at least one filter that reduces or removes odors and/or dust, and then releasing the exhaust air into the atmosphere.

14. A method according to claim 13, including the step of disinfecting at least one partial current of the stall exhaust air before or after its use for drying the feces and/or for vaporizing the liquid portion of the urine, and thereafter said partial current of the stall exhaust air is used immediately for the aeration of the urine, for the oxidation and/or disinfection thereof.

15. An apparatus for disposing of excrement, made up of feces and urine, of animals kept in a stall comprising:

a separating apparatus for a separation of deposited excrement into urine and feces, separate carry-off paths leading out of the stall for a separate carrying off of the urine and of the feces, at least one separate storage and further treatment apparatus for the urine and for the feces, the apparatus for the further treatment of the feces comprising a device for the surface enlargement and drying of the feces, to a moisture content that prevents a decomposition, at which moisture content the feces can be stored and transported, the apparatus for the further treatment of the urine comprising at least one of a vaporization device and a drying device in which the liquid portion of the urine can be vaporized and the remaining solid substance can be dried, wherein one of a single exhaust air filter and a common exhaust air filter is connected downstream from at least one of the drying device and the vaporization device.

16. An apparatus according to claim 15, wherein the apparatus for the further treatment of the feces additionally comprises a pressing device for the production of pressed fecal pieces, having a residual moisture content that prevents a decomposition, from feces that is first dried in the drying device only to a moisture content of between approximately 10 and 25% by weight.

17. An apparatus according to claim 16, wherein the pressing device is a pelleting device or a briquetting device.

18. An apparatus according to claim 15, wherein the stall comprises at least one excrement deposition surface having a gradient, in whose deepest region at least one urine collection canal runs, whereby the gradient is maximally of a magnitude such that after deposition, the feces remains lying securely on the deposition surface, and the deposition surface is equipped with a mechanical device for carrying off feces, with which the feces is carried off in a direction of conveyance that deviates from the direction of the gradient, and with the maintenance of a distance from the urine collection canal.

19. An apparatus according to claim 18, wherein the stall is constructed with a slatted floor at least over a part of its floor surface, and the excrement deposition surface is the floor surface of a canal arranged underneath the slatted floor, and gaps of the slatted floor and the direction of the gradient run essentially parallel to one another.

20. An apparatus according to claim 18, wherein the device for carrying off feces is formed by a feces blade that is moved parallel to the urine collection conduit.

21. An apparatus according to claim 18, wherein for the formation of the device for carrying off feces, the deposition surface is constructed as a conveyor that is moved parallel or transverse to the urine collection canal, whereby the conveyors comprise a closed or perforated surface.

22. An apparatus according to claim 15, wherein one of a mixing device and dusting device, with which the feces can be one of impregnated and dusted with a dry powdered disinfecting agent as needed, is connected one of upstream and downstream from the drying device.

23. An apparatus according to claim 15, wherein the apparatus for the further treatment of the urine comprises at least one of a urine oxidation device and a urine disinfection device.

24. An apparatus according claim 23, wherein at least one of the urine disinfection device and the exhaust air disinfection device comprises a source for at least one of UV radiation and gamma radiation, with which at least one of the urine and the exhaust air can be irradiated.

25. An apparatus according to claim 15, wherein the apparatus for the further treatment of the urine comprises one of a one-stage mechanical, a multistage mechanical and a mechanical-biological clarification apparatus.

26. An apparatus according to claim 15, wherein at least one of the drying device for the feces, the vaporization device for the liquid portion of the urine, and a heat exchanger for a pre-heating of fresh air that is to be supplied to the stall, can be operated with heat energy from stall exhaust air that is heated by animal body heat.

27. An apparatus for disposing of excrement, made up of feces and urine, of animals kept in a stall comprising:

a separating apparatus for a separation of deposited excrement into urine and feces, separate carry-off paths leading out of the stall for a separate carrying off of the urine and of the feces, at least one separate storage and further treatment apparatus for the urine and for the feces, the apparatus for the further treatment of the feces comprising a device for the surface enlargement and drying of the feces, to a moisture content that prevents a decomposition, at which moisture content the feces can be stored and transported the apparatus for the further treatment of the urine comprising at least one of a vaporization device and a drying device in which the liquid portion of the urine can be vaporized and the remaining solid substance can be dried and also comprises one of a one-stage mechanical, a multistage mechanical and a mechanical-biological clarification apparatus, wherein this apparatus comprises an exhaust air disinfection device in which at least one partial stream of the stall exhaust air is disinfected one of before and after its use in at least one of the drying device and in the vaporization device, and from which the partial stream is supplied immediately to at least one of the urine storage container and to the clarification apparatus, for the aeration of the urine for the purpose of at least one of the oxidation and disinfection thereof.

28. An apparatus for disposing of excrement, made up of feces and urine, of animals kept in a stall comprising:

a separating apparatus for a separation of deposited excrement into urine and feces, separate carry-off paths leading out of the stall for a separate carrying off of the urine and of the feces, at least one separate storage and further treatment apparatus for the urine and for the feces, the apparatus for the further treatment of the feces comprising a device for the surface enlargement and drying of the feces, to a moisture content that prevents a decomposition, at which moisture content the feces can be stored and transported, the apparatus for the further treatment of the urine comprises at least one of a vaporization device and a drying device in which the liquid portion of the urine can be vaporized and the remaining solid substance can be dried, wherein this apparatus comprises an exhaust air disinfection device in which at least one partial stream of the stall exhaust air is disinfected one of before and after its use in at least one of the drying device and in the vaporization device, and from which the partial stream is supplied immediately to at least one of the urine storage container and to the clarification apparatus, for the aeration of the urine for the purpose of at least one of the oxidation and disinfection thereof.

* * * * *